No. 635,692. Patented Oct. 24, 1899.
M. F. KROGH.
APPARATUS FOR BOILING MILK.
(Application filed Feb. 18, 1899.)
(No Model.)
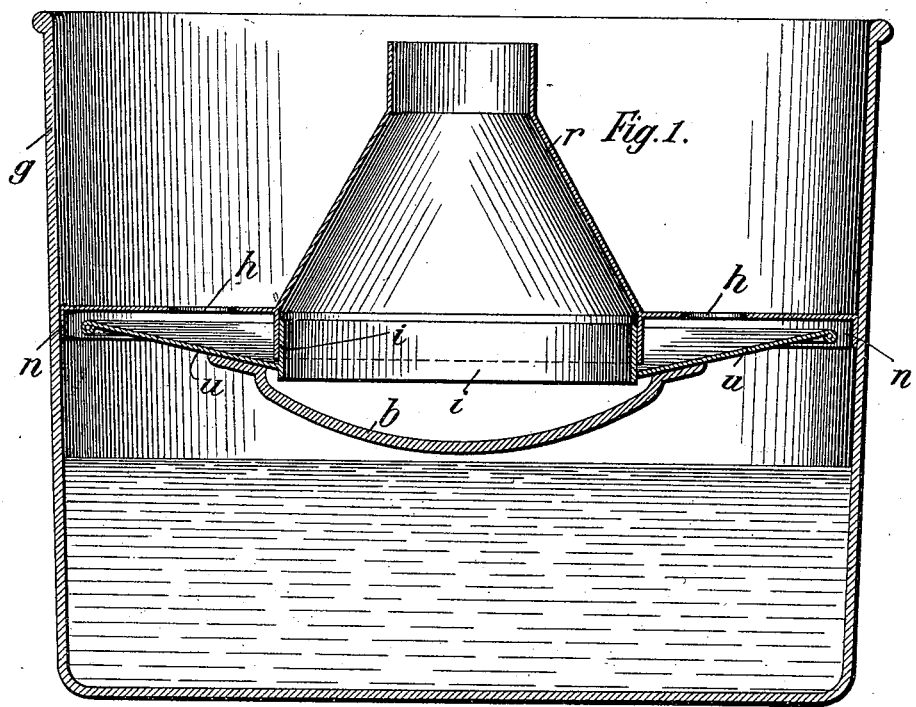
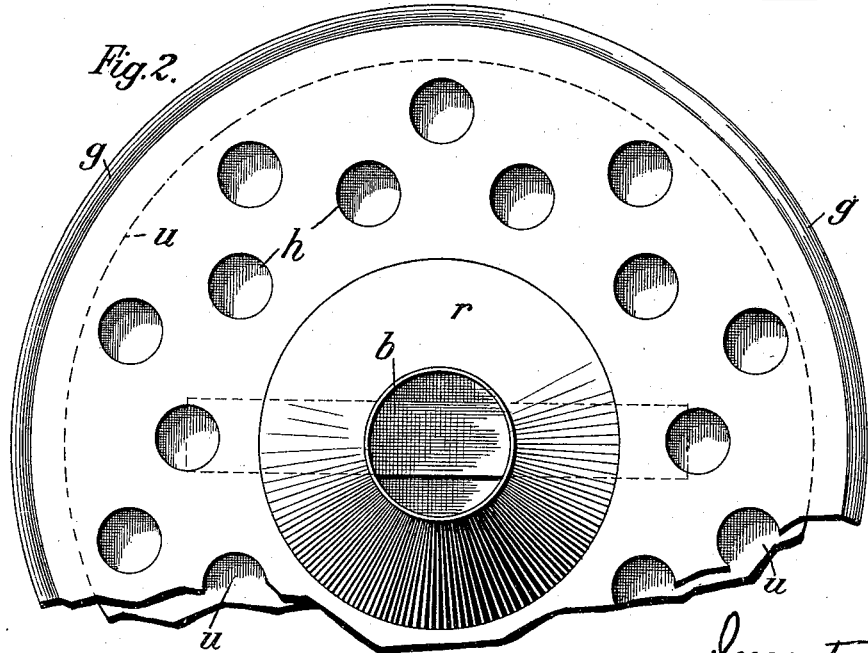

United States Patent Office.

MARIUS FREDERIK KROGH, OF ROTHENKRUG, GERMANY.

APPARATUS FOR BOILING MILK.

SPECIFICATION forming part of Letters Patent No. 635,692, dated October 24, 1899.

Application filed February 18, 1899. Serial No. 705,969. (No model.)

*To all whom it may concern:*

Be it known that I, MARIUS FREDERIK KROGH, manufacturer, a subject of the Emperor of Germany, residing at Rothenkrug, in the Kingdom of Prussia and Empire of Germany, have invented certain new and useful Improvements in Apparatus for Boiling Milk, of which the following is a full, clear, and exact description.

This invention relates to apparatus for boiling milk to prevent the boiling over of the latter. This apparatus has the advantages of great convenience in manipulation and cheapness as compared with other devices designed for the same purpose.

In order that this invention may be the better understood, I now proceed to describe the same with reference to the accompanying drawings and to the letters marked thereon.

Like letters refer to like parts in both figures.

Figure 1 is a vertical section through a vessel provided with my device, and Fig. 2 is a partial plan thereof.

The inner side of the vessel $g$, in which the milk is boiled, must be smooth either entirely or for the greater part thereof, so that a piston-like partition $n$ can smoothly move up and down therein. The partition $n$ has holes $h$. A truncated funnel $r$ rises from the middle of the cylinder. The funnel $r$ narrows upward and is open at top and bottom to allow the milk to ascend therein and overflow at the top if it should rise too much. The milk which has overflowed returns to the lower part of the vessel $g$ through the perforations $h$ in the partition. The milk returns to the lower part of the vessel $g$ by a very flat conical funnel or tray $u$, arranged below the partition $n$ as a baffle-plate under the holes to prevent the rising milk from conflicting with the falling milk, and this tray is easily removed and is provided with a handle $b$. The milk flows down on this funnel or tray $u$ and collects in the middle, whence it returns over the outer edge into the lower part of the vessel $g$. The central position of the tray or funnel $u$ is insured by the upright rim $i$, provided on it, fitting into the central orifice of the partition.

The action of this apparatus is found to be excellent, one of the principal features being that the device can rise and fall in the vessel $g$ according as to whether the milk boils more or less. When inserted, the device sinks directly onto the level of the milk and, yielding gradually to the pressure of the boiling milk, prevents the boiling over of the latter over the rim of the vessel $g$.

Having now particularly described and ascertained the nature of this invention and in what manner the same is to be performed, I declare that what I claim is—

Apparatus to prevent the boiling over of milk consisting of a perforated piston-like partition adapted to smoothly rise and fall on the inside of the boiling vessel, a truncated upper funnel narrowing upward open at top and bottom, and of a flat conical lower funnel or tray shelving downward, in order that the milk rising in and overflowing the truncated funnel may return into the lower part of the boiling vessel through the perforated partition and shelving-funnel the whole device resting upon and rising with the milk substantially as described.

In witness whereof I subscribe my signature in presence of two witnesses.

MARIUS FREDERIK KROGH.

Witnesses:
 F. ROJIKL,
 H. A. MÖLLER.